United States Patent [19]

Dachs

[11] 4,256,625
[45] Mar. 17, 1981

[54] POLYESTER COMPOSITIONS OF ENHANCED TENSILE STRENGTH ON AGEING

[75] Inventor: Norman W. Dachs, Buffalo, N.Y.

[73] Assignee: Hooker Chemicals & Plastics Corp., Niagara Falls, N.Y.

[21] Appl. No.: 118,382

[22] Filed: Feb. 5, 1980

Related U.S. Application Data

[63] Continuation-in-part of Ser. No. 921,027, Jun. 30, 1978, abandoned.

[51] Int. Cl.$^3$ .............................................. C08G 63/68
[52] U.S. Cl. ................. 260/40 R; 260/40 P; 260/45.7 PS; 528/125; 528/126; 528/168
[58] Field of Search ........... 260/40 R, 40 P, 45.7 PS; 528/125, 126, 168

[56] References Cited

U.S. PATENT DOCUMENTS

| | | | |
|---|---|---|---|
| 3,378,523 | 4/1968 | Caldwell et al. | 528/168 |
| 3,644,593 | 2/1972 | Nowak et al. | 260/900 |
| 3,844,983 | 10/1974 | Reynard et al. | 528/168 |
| 3,880,798 | 4/1975 | Deem et al. | 528/168 |
| 4,002,581 | 1/1977 | Dolce | 260/40 R X |
| 4,123,420 | 10/1978 | Kyo et al. | 528/127 |

FOREIGN PATENT DOCUMENTS 812827 7/1974 Belgium .................. 528/167

*Primary Examiner*—Lester L. Lee
*Attorney, Agent, or Firm*—Peter F. Casella; James F. Mudd; David A. Stein

[57] ABSTRACT

The invention relates to thermoplastic polymeric compositions comprising a linear aromatic polyester of a bisphenol and a dicarboxylic acid admixed with a minor proportion of a perfluoroalkenoxy surface active compound. These compositions which are suitable for use as film or molding compositions exhibit enhanced tensile strength on ageing without substantial detriment to other properties of the polyester.

17 Claims, No Drawings

POLYESTER COMPOSITIONS OF ENHANCED TENSILE STRENGTH ON AGEING

CROSS REFERENCE TO RELATED COPENDING APPLICATION

This application is a continuation-in-part of copending U.S. Application Ser. No. 921,027 filed June 30, 1978 and now abandoned.

BACKGROUND OF THE INVENTION

This invention relates to a thermoplastic polymeric composition which comprises a linear aromatic polyester of a bisphenol and a dicarboxylic acid in admixture with certain organic phosphate acid and organic phosphate salt compounds and which exhibts an enhancement of tensile strength on ageing. More particularly, the invention is directed to such compositions wherein the organic phosphate compound is a perfluoroalkenoxy-substituted surface active compound.

Linear aromatic polyesters prepared from dicarboxylic acids (especially aromatic dicarboxylic acids) and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation, good electrical properties, relatively good ease of processability and stability on processing.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding apparatus (i.e. less than about 300° C.). This type of glycol-modified polyester is more fully disclosed in U.S. Pat. No. 3,471,441, to Hindersinn et al.

However, a persistent problem with aromatic polyesters has been found to be a pronounced tendency of the aromatic polyester to lose tensile strength on ageing, especially on ageing at elevated temperatures.

Thus, it is found that on ageing at 160° for 60 days a bisphenol A-isophthalate-terephthalate polyester loses more than about 32% of its initial tensile strength.

The prior art does not disclose the use of additives to linear aromatic polyesters to enhance the tensile strength thereof on ageing. The prior art has proposed the addition to polyesters of various organic phosphate compounds and fluorinated organic compositions which are distinctive from the additive of the invention. Moreover, the use of the prior art additives produces modifications of the properties of the polyester other than the tensile strength enhancement on ageing achieved by the invention. For example Belgian Pat. No. 812,827 (to Teijin) published Mar. 28, 1973, discloses a composition comprising 1) an aromatic polyester of a glycol component comprising at least 70 mole percent tetramethylene glycol and at least 70 mole percent of an aromatic dicarboxylic acid (e.g. polybutylene terephthalate) and 2) 5 to 50% of a polycarbonate which contains 0.01 to 3% (based on the polyester) of a discoloration prevention agent which, inter alia, is a simple monoester of phosphoric acid or salt thereof such as the mono-methyl ester of phosphoric acid. It is noted that the reference composition is distinguished from that of invention since the composition contains a substantial amount of a polycarbonate which is known to be distinctive in properties from the dicarboxylic acid-derived polyesters of the invention. The additive of the reference is also distinguished from the additive copound of the invention which, as a surface active compound, contains in addition to the ionogenic phosphate group a highly hydrophobic and olephobic perfluoroalkenoxy group. Furthermore the additive of the invention, unlike that of reference does not prevent polymer discoloration (as described in Example 2 below). In any case, prevention of polymer discoloration is not suggestive of the beneficial effect of the present additive, namely tensile strength enhancement on ageing.

U.S. Pat. No. 4,002,581 (T. J. Dolce to General Electric Co.) discloses a foamed composition comprising a linear polyester such as polybutylene terephthalate, a polymer of an alpha olefin and a polytetrafluoroethylene resin having improved toughness. The reference compositions may contain a minor proportion of a flame retardant, inter alia, a phosphate ester. However, the phosphate esters disclosed by the reference are di- or tri-esterified phosphoric acid devoid of the ionogenic group and hydrophobic/olephobic group present in the surface active compound additive of the invention. The flame retardant property achieved by use of the reference phosphate additive is also not suggestive of the tensile strength enhancement property of the present compositions. Furthermore, the fluorine-containing resin additive of the reference is distinguished from the present additive in being a thermoplastic resin containing only fluorine substituents whereas in contrast the present additive is a surface active compound substituted with additional groups such as —$SO_2$— and hydrogen.

U.S. Pat. No. 3,644,593 (B. E. Nowak et al. to Carborundum Co.) discloses mixtures of an oxybenzoyl polyester and a polyfluorinated addition polymer of a fluorinated monomer (such as tetrafluoroethylene and vinylidene fluoride) which have one or more of the following properties: better lubricant property, less brittleness, better wear resistance and low creep. The fluorinated resin additive of the reference is structurally distinguished from the additive of the invention in being a resin devoid of the ionogenic substituent present in the additive of the invention. Moreover, none of the enhanced properties ascribed to the reference composition is suggestive of the enhancement, on ageing, of the polyester tensile strength which is achieved by the invention.

U.S. Pat. No. 3,880,798 (W. R. Deem et al. to Imperial Chemical Industries Ltd.) describes use of surface active agents (inter alia the surface active compound of the present invention) as mold release agents in molding polymers such as polyolefins and polyurethanes. Use of a mold release agent generally involves addition of the mold release agent to the mold and does not involve mixing the mold release agent with the polymer as taught by the invention. Moreover, the reference polymers for which use of the surface active agent as mold release agent is prescribed are structurally remote from the present polyesters.

Accordingly, it is a principal object of the present invention to provide linear aromatic polyester compositions which have enhanced tensile strength on ageing and yet substantially retain the other desirable properties of the polyester such as ease of processing and thermal stability on processing.

SUMMARY OF THE INVENTION

It is found in accordance with the invention that addition of minor amounts of certain organic phosphate esters and salts thereof to linear aromatic polyesters derived from a bisphenol and a dicarboxylic acid substantially enhance the tensile strength of the polyester on ageing.

More particularly the invention provides a thermoplastic resin composition comprising in admixture
 (a) a linear aromatic polyester of a bisphenol and a dicarboxylic acid, and
 (b) a minor proportion based on the polyester of a surface active compound of the formula:

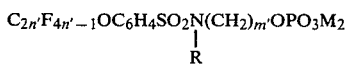

wherein M is hydrogen, alkali metal, ammonium, alkyl-substituted ammonium, or mixture thereof,
 n is 4, 5 or 6,
 R is an alkyl group containing from one to five carbon atoms or hydrogen and
 m is an integer from one to six.

The carboxylic acid monomer residue of the present polyester component consists essentially of a polycarboxylic acid.

The compositions of the invention exhibit a substantial enhancement in tensile strength on ageing at elevated temperature (i.e. 160° for 60 days) of as much as about 23%. In contrast the corresponding polyester, devoid of the additive loses more than 32% of its tensile strength on ageing under the same temperature for the same length of time.

The substantial enhancement in tensile strength which is achieved in the present compositions is not accompanied by any substantial loss in the other beneficial properties of the polyester such as ease of processability of the polyester and thermal stability of the polyester during processing.

DESCRIPTION OF THE PREFERRED EMBODIMENTS

PREPARATION OF LINEAR AROMATIC POLYESTER

The linear carboxylate aromatic polyesters of the present invention can be prepared by condensing a diacid halide of a dicarboxylic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

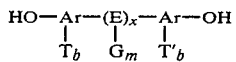

wherein Ar is aromatic, preferably containing 6–18 carbon atoms (including phenyl, biphenyl and napthyl); G is alkyl, haloalkyl, aryl, haloaryl, alkylaryl, haloalkyaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—,

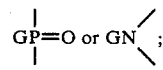

T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows:

alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane, (4-hydroxyphenyl-, 2-hydroxyphenyl)-methane, and mixtures thereof; bis(4-hydroxy-3,5-dichlorophenyl)methane, bis(4-hydroxy-3,5-dibromophenyl)methane, bis(4-hydroxy-3,5-difluorophenyl)methane, bisphenol-A[bis(4-hydroxyphenyl)-2,2-propane]bis-(4-hydroxy-3,5-dichlorophenyl)-2,2-propane. bis(3-chloro-4-hydroxyphenyl)-2,2-propane, bis(4-hydroxynaphthyl)-2,2-propane, bis(4-hydroxynaphthyl)-2,2-propane, bis(4-hydroxyphenyl)-phenyl methane, bis(4-hydroxyphenyl) diphenyl methane, bis(4-hydroxyphenyl)-4'-methyl phenyl methane, bis(4-hydroxyphenyl)-4'-chlorophenyl methane, bis(4-hydroxyphenyl)-2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxynaphthalenes, bis(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-tertiary butylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(b 4-hydroxyphenyl)sulfone, bis(4-hydroxyphenyl)sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)propane, 4,4'-(cyclomethylene) bis-(2,6-dichlorophenol; 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl-hexane, 4,4'-dihydroxy-3,3',5,5'-tetra-chlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propane, tetra-chlorodiphenylolsulfone, bis(3,5-dibromo-4-hydroxyphenyl)-phenyl phosphine oxide, bis(3,5-dibromo-4-hydroxyphenyl)sulfoxide, bis(3,5-dibromo-4-hydroxyphenyl)sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octochloro-4-4'-dihydroxy biphenyl. Representative biphenols are o,o'-biphenol, m,m'-biphenol; p,p'-biphenol; bicresols, such as 4,4'-bi-o-cresol, 6,6'-bi-o-cresol, 4,4'-bi-m-cresol; dibenzyl biphenols such as a,a'-diphenol-4,4'-bi-o-cresol; diethyl biphenols such as 2,2'-diethyl-p,p'-biphenol, and 5,5'-diethyl-o,o'-biphenol; dipropyl biphenols such as 5,5'-dipropyl-o,o'-biphenol and 2,2'-diisopropyl-p,p'-biphenol; dially biphenols such as 2,2'-diallyl-p,p'-biphenol; and dihalobphenols, such as 4,4'-dibromo-o,o'-biphenol. Mixtures of isomers of the foregoing bisphenols can be used.

The dicarboxylic acids which are useful in this process are also well known and are represented by the formula:

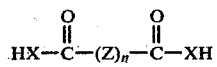

in which X is oxygen or sulfur, Z is alkylene, —Ar— or —Ar—Y—Ar— where Ar has the same definition as given with respect to the bisphenols, Y is a alkylene, of 1 to 10 carbons, haloalkylene, —O—, —S—, —SO—, —SO$_2$—, —SO$_3$—, —CO—,

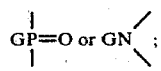

and n is 0 or 1.

Suitable dicarboxylic acids include aromatic dicarboxylic acids such as phthalic acid, isophthalic acid, terephthalic acid, bis(4-carboxy)-diphenyl, bis(4-carboxyphenyl)-ether, bis(4-carboxyphenyl)-sulfone, bis(4-carboxyphenyl)-carbonyl, bis(4-carboxyphenyl)-methane, bis(4-carboxyphenyl)-dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1,1-dimethyl propane, 1,1- and 2,2-bis(4-carboxyphenyl)-butane, 1,1- and 2,2-bis(4-carboxyphenyl)-pentane, 3,3-bis(4-carboxyphenyl)-heptane, 2,2-bis(4-carboxyphenyl)-heptane, and aliphatic acids such as oxalic acid, adipic acid, succinic acid, malonic acid, sebacic acid, glutaric acid, azelaic acid, suberic acid and the like.

The preferred aromatic polyesters of this invention are prepared from bisphenols and at least one aromatic dicarboxylic acid, most preferably selected from the group consisting of isophthalic acid, terephthalic acid, or mixtures thereof. Isophthalic acid and terephthalic acid are preferred due to their availability and low cost. Most preferably, the dicarboxylic acid component comprises a mixture of about 75 to about 100 mol percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacid halide of a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. preparatory process correspond to those described above. The aliphatic modifier is a reactive difunctional component which may be represented by the formula:

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkylene-carboxyalkyl, and poly(alkylene carboxyalkylene-carboxy)alkyl; and n is an integer from 1 to 2 with n being 2 when D and D' is N. Typical examples of aliphatic modifiers having the foregoing formula include ethylene glycol, diethylene glycol, neopentyl glycol, 1,4-cyclohexane, dimethanol, 1,4-butane dithiol, dipropylene glycol, polypropylene glycol, 1,1-isopropylidene bis(p-phenyleneoxy)di-2-ethanol, 2,2,4,4-tetramethyl-1,3-cyclobutanediol, bis(4-hydroxycyclohexane)-2,2-propane, di(hydroxyethyl)adipate, di(hydroxypropyl)-glutarate, di(hydroxyethyl)poly(ethylene glycol)adipate, ethane dithiol, ethanolamine, methylethanolamine, hexamethylenediamine, 1,3-propanediol, 2-mercaptoethanol, and 2-aminopropanethiol. Combinations of the above-described aliphatic modifiers can also be employed, usually to obtain special properties.

Solution processes can also be employed in the preparation of suitable aromatic polyesters, such as disclosed in U.S. Pat. Nos. 4,051,107 and 4,051,106, the disclosures of which are incorporated herein by reference.

The polyester components of the invention are preferably prepared by a process, described as melt polymerization, involving an ester interchange, i.e. transesterification reaction, between a diphenolic reactant and a diaryl ester of a dicarboxylic acid carried out in the melt (i.e. without use of a reaction solvent or diluent). Such a process is described in British Pat. No. 924,607, to Imperial Chemical Industries, Limited, the disclosure of which is incorporated herein by reference.

A further melt polymerization process which can be used to prepare linear aromatic polyesters suitable for use in this invention is described and claimed in copending application Ser. No. 818,493, filed July 25, 1977, as a continuation-in-part of application Ser. No. 542,635, filed Jan. 20, 1975, now abandoned. This process basically comprises first mixing a bisphenol, a diaryl ester of a dicarboxylic acid and a diol, and then reacting the resulting mixture in the presence of a transesterification catalyst. The disclosure of the pending application is incorporated herein by reference.

PREPARATION OF THE PERFLUOROALKENOXY-SUBSTITUTED ADDITIVE

The perfluoroalkenoxy additives of the invention correspond to a known class of surface active compound having the general formula:

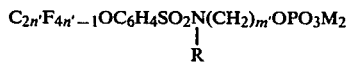

wherein M is selected from the univalent groups consisting of hydrogen, alkali metal, ammonium, alkyl-substituted ammonium and mixtures thereof,
 n' is 4, 5 or 6,
 R is an alkyl group containing from one to five carbon atoms or is hydrogen, and
 m' is an integer from one to six.

The additive of the invention may be regarded as a mono-substituted n-alkylene mono ester of ortho phosphoric acid or a salt thereof. The group M is typically hydrogen, an alkali metal such as lithium, sodium, potassium and rubidium, an ammonium cation or alkyl substituted ammonium cation such as methyl-ammonium, di-n-pentyl ammonium, tri-isopropyl ammonium, tetra-methyl-ammonium, or dimethyl-, diethyl-ammonium. M can also be a mixture of two of the foregoing monovalent groups for example sodium and hydrogen or potassium and ammonium. Preferably M is hydrogen.

When the group R is alkyl, it is typically a methyl, ethyl, isopropyl, isobutyl, t-butyl or n-pentyl group. The group R is preferably a methyl or ethyl group.

With respect to the group —(CH$_2$)$_{m'}$—, the integer m' is preferably a small integer less than four; especially preferred are the range of compounds wherein m is equal to 2.

Typically the group —(CH$_3$)$_{m'}$— is methylene, ethylene, propylene, or hexylene.

The perfluoroalkenyl group $C_{2n'}F_{4n'-1}$ may be a straight-chain group but is advantageously a branched group derived from a self-condensation product of tetrafluoroethylene, i.e. a product of the formula $C_{2n'}F_{4n'}$ wherein n' has the above-described meaning.

The $C_6H_4$ group is a disubstituted phenylene group wherein the two substituents may be ortho, meta or para but are desirably in the para positions on the phenylene ring.

The compounds of the present invention may be made conveniently from the aromatic sulphonic acid or sulphonyl chloride derivative of the phenyl ether derivative of a perfluoroolefin ether $C_{2n'}F_{4n'-1}OC_6H_5$. Such derivatives have been disclosed in British Pat. Nos. 1,130,822 and 1,270,662, the disclosures of which are incorporated herein by references.

A preferred method of preparation is by means of a reaction between $C_{2n'}F_{4n'-1}OC_6H_4SO_2Cl$ and a compound of formula $RNH(CH_2)_{m'}OPO_3M$ wherein R and m' are as hereinbefore defined.

A preferred method of preparation of the additives of the invention is by the action of a phosphorous oxyhalide (for example phosphorus oxychloride) or phosphorous pentoxide on a perfluoroalkenoxy phenol N,N' substituted sulfonamide alcohol having the structure

wherein n', m' and R are as hereinbefore defined.

The additives of the invention are surface-active agents by reason of the terminal oleophobic and hydrophobic perfluorocarbon group and the hydrophilic anionic group at the opposite end of the molecule.

The description of the present additives as surface active compounds as employed in the present specification is for purposes of structural identification and is not meant to imply a description of the mechanism by which the present additives enhance, on ageing, the tensile strength of the polyesters to which they are added in accordance with the invention.

The preparation and properties of the present additives are more particularly described in aforementioned U.S. Pat. No. 3,880,798 (to W. R. Deem et al.) the disclosure of which is incorporated herein by reference.

A preferred perfluoroalkenoxy additive of the invention is $C_{10}F_{19}OC_6H_4SO_2N(CH_3)(CH_2CH_2)OPO_3H_2$ which is described in Example 4 of the aforementioned U.S. Pat. No. 3,880,798 and is marketed by Imperial Chemical Industries as a 10 percent by weight solution in an inert, volatile perhaloalkane solvent, namely, 1,1,2-trichloro-1,2,2-trifluoroethane.

The proportion of the additive employed in the practice of the invention is normally a minor proportion based on the weight of the linear aromatic polyester. Generally the proportion of the additive, i.e. of solid additive is about 0.001 to about 5% based on the weight of the polyester. Use of more than about 5% of the additive, for example use of about 10% or more of the additive, while generally effective, is undesirable for reasons of economy. Preferably the proportion of the surface active compound employed in the invention is about 0.01 to about 3%, and is especially about 0.05 to about 2%, based on the weight of the linear aromatic bisphenol polyester.

PREPARATION OF THE COMPOSITIONS OF THE INVENTION

The compositions of the invention are uniform or homogeneous blends of the polyester and the surface active compound which are prepred by addition of the surface active compound to the polyester prior to or during processing while the polyester is in molten condition. Typically a homogeneous physical mixture of the linear aromatic bisphenol polyester and the surface active compound is prepared in a ball-mixer or equivalent mixing apparatus. The resultant product is subjected to milling in molten condition and is then pressed as a film or extrusion molded or preferably injection molded employing apparatus and techniques which are conventional with thermoplastic resins such as the linear aromatic bisphenol polyester. If injection molding of the present composition is desired, it may be desirable to substitute an extrusion molding step for processing of the molten composition in a mill prior to the final injection molding of the composition. Films, as well as various shaped molded articles such as rods, bars, rings, etc., can be prepared from the present thermoplastic polymeric composition.

OPTIONAL ADDITIVES

The present thermoplastic polymeric compositions which exhibit enhanced tensile strength on ageing can be employed in various polyblends containing minor proportions of other polymers for example polyphenylene sulfide (such as is described in copending U.S. application Ser. No. 905,623, filed May 12, 1978, and the rubber reinforced-styrene-maleic anhydride polymer (such as is described in copending U.S. application Ser. No. 863,553, filed Dec. 22, 1977), a bisphenol polysulfonate (such as is described in U.S. application Ser. No. 921,026 filed of even date herewith) and a heterogeneous crosslinked acrylate methacrylate copolymer such as is described in U.S. application Ser. No. 920,891 filed of even date herewith. The disclosures of the aforementioned four applications are incorporated herein by reference.

The thermoplastic compositions of the present invention may also include various additives such as flame retardants, organic or inorganic fillers, stabilizers, and antistatic agents.

As flame retardants there can be used the halogen-containing flame retardant agents disclosed in U.S. application Ser. No. 863,556, filed Dec. 22, 1977. Alternatively, the halogen-containing polyester derived from a halogen-substituted bisphenol as described in copending U.S. application Ser. No. 863,381, filed Dec. 22, 1977, the disclosure of which is incorporated herein by reference, can be added to the present composition to enhance flame retardance. As an additional alternative, all or a portion of the bisphenol component of the present polyester can be a halogen-substituted bisphenol to enhance the flame retardance of the composition.

The fillers which may be employed in the invention are preferably particulate fillers such as particulate glass (e.g. chopped glass fiber, glass rovings, glass microballoons or microspheres and pulverulent glass) particulate clay, talc, mica, inorganic natural fibers, synthetic organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color opacity, and improve the surface finish of the polymer composition. Generally the amount of particulate filler employed in the compositions of the invention is in the range of about 5 to about 70 weight percent, preferably about 5 to about 40 weight percent and especially about 8 to about 30 weight percent based on the weight of the polyester. The filler employed preferably is inorganic and more preferably is particulate glass and especially is glass fiber. A proprietary glass fiber composition marketed by Owens Corning Fiberglass Corporation under the designation 419AA provides a particularly good result when employed as a filler in accordance with the invention.

The present polyester compositions containing one of more of the above described optional additives can be prepared by charging the additive to the aforementioned mixing step prior to milling and molding or film pressing. If desired, the optional additive can be added subsequent to the milling operation but prior to the final processing step.

The present compositions in exhibiting a substantial enhancement of tensile strength on ageing at ambient temperature (or equivalent ageing under accelerated ageing conditions at an elevated temperature of 160° as described in the Examples below) are especially suitable on account of the known excellent electrical properties of the polyester in electrical applications, for example in appliances such as radios and television sets which are often operated continuously at elevated temperatures which would cause a conventional aromatic linear polyester to lose tensile strength rapidly.

The following examples further illustrate the various aspects of the invention but are not intended to limit it. Various modifications can be made in the invention without departing from the spirit and scope thereof. Where not otherwise specified in this specification and claims, temperatures are given in degrees centirade, and all parts, proportions and percentages are by weight.

EXAMPLE 1

PREPARATION OF LINEAR AROMATIC POLYESTER

(A) By Solution Polymerization

A reaction vessel equipped with agitation means is purged of air and moisture by sweeping dry nitrogen through the vessel at 100° for four hours. To the reactor is charged a mixture of 165.7 parts isophthaloyl chloride, 29.2 parts of terephthaloyl chloride, 216.4 parts of bisphenol A and 3.8 parts of para-tertiary butyl phenol, a reaction mixture viscosity control agent, dissolved in 2270 parts of methylene chloride, which previously has been dried to a water content of 10 ppm. Over a period of 5.7 hours, 200.7 parts of triethyl amine catalyst are added under a nitrogen atmosphere at a constant rate to the agitated reaction mixture which is maintained at 15° during the addition. Upon completion of the addition, the reaction mixture is agitated for three hours at 20°. Dilute aqueous hydrochloric acid (57.0 parts, 0.5% solution) is then added to the reaction mixture in order to react with the triethylamine. After the reaction mixture has been agitated for an additional hour, the reaction mixture is allowed to stratify into an organic layer and an aqueous layer. After removal of the aqueous layer, the organic layer containing the product is continuously washed with deionized water until the concentration of chloride ion in the organic layer is less than 0.1 ppm. The polymer product is then precipitated from the organic layer and is collected. The polyester thus recovered is dried in a vacuum oven until the moisture content is less than 0.1%.

(B) By Melt (transesterification) Polymerization

Bisphenol-A (1319.1 g), diphenyl terephthalate (275.9 g) and diphenyl isophthalate (1562.9) are dried for several hours at 75° in a vacuum oven and charged with 0.07 g of anhydrous lithium hydroxide transesterification catalyst to a 5-liter resin kettle under nitrogen. The kettle is equipped with a thermometer, a nitrogen inlet on a Y-tube, a mechanical stirrer, a short Vigreaux column, a distillation head and 3 necked flask receiver.

The kettle is heated to 210° to melt the reactants and vacuum is applied gradually to the stirred molten mass. The temperature of the reaction mass is increased gradually to remove phenol overhead to the receiver. After 1.4 hours the temperature of the reaction mass reaches 228° and the reaction pressure is about 0.5 mm Hg. The reaction mass is then flooded with dry nitrogen to relieve the vacuum and the viscous reaction mass is poured into a foil-lined glass tray and allowed to cool to ambient temperature.

The bisphenol A-isophthalate-terephthalate prepolymer thus obtained is broken up and dried overnight at 70° in a vacuum oven. The dried prepolymeer (1070 g.) is charged to a two gallon oil-heated stainless steel reactor equipped with agitation means under dry nitrogen and heated with agitation to 210°. Agitation of the molten mass is commenced after 1 hour. After 1.3 hours from the commencement of heating, vacuum (about 0.6 mm of Hg) is applied to the agitated mass. The reaction temperature is raised gradually over a period of about 2 hours to 305°. The agitated reaction mass is then maintained under vacuum at 305° for 6.7 hours. The reactor is opened and the polyester obtained is discharged from the reactor and allowed to cool to ambient temperature. A clear yellow bisphenol A-isophthalate-terephthalate polyester having a relative viscosity of 1.36 (measured in tetrachloroethane at 30°) is obtained.

The foregoing procedure is repeated with 1100 g. of prepolymer being employed in the polymerization reaction. A similar polymer product is obtained having a relative viscosity of 1.35 (measured in tetrachloroethane at 30°).

EXAMPLE 2

After the linear aromatic polyester of bisphenol A, isophthalic acid and terephthalic acid prepared as described in Example 1A above has been dried for 4 hours at 120°, 600 g. of the polyester and 3 g. of a 10% solution in 1,1,2-trichloro-1,2,2-trifluoroethane of $C_{10}F_{19}OC_6H_4SO_2N(CH_3)(CH_2CH_2)OPO_3H_2$, corresponding to 0.05% of solid additive based on the polyester) are added to ball mill. After the mixture has been milled for 2 hours at ambient temperature to insure homogeniety, the mixture is chaged to a Haake Extruder operating under the following conditions:

| Zone 1 | Temperature | 280° |
|---|---|---|
| Zone 2 | Temperature | 280° |
| Zone 3 | Temperature | 270° |
| Zone 4 | Temperature | 270° |
| Die Melt | Temperature | 290–295° |
| | RPM | 100 |
| | Torque | 4000–5000 m.-g. |

The hot product which is extruded from the Haake extruder as a strand of ⅛ inch average diameter is cut into pellets of about ⅛ inch length and allowed to cool to ambient temperature over anhydrous calcium sulfate to obtain a product which is pale yellow in color and substantially transparent.

The pellets are injected molded into sample bars in an Arburg 221 E/150 Injection Molding Machine operating under the following parameters:
Barrel Temperature 630° F.
Injection Pressure (psi) 16,700.
Mold (Cavity) Temperature 250° F.

The resultant molded product has an intrinsic viscosity of 0.52 dl/g. as measured in symmetrical tetrachloroethane at 30°. A portion of the same bars are tested for tensile strength and tensile modulus in accordance with ASTM Test D-638. Another portion of the sample bars are maintained in an air circulating oven at 160° for 30 days and then are tested for tensile strength and tensile modulus as previously described. A third portion of the sample bars of the product are maintained in the above-described oven at 160° for 60 days and then are tested for tensile strength and modulus as previously described. The color and transparency of the sample bars prior to, and subsequent to, ageing are also noted. The results of these tests are set forth in the Table below.

For purposes of comparison, a sample of the polyester of Example 1A is mixed and molded as described above in absence of the present additive to prepare sample bars having the same Intrinsic Viscosity (0.52 dl/g) as the same bars containing the polyester and the additive. The polyester samples are tested for tensile strength and tensile modulus prior to ageing and subsequent to ageing at 160° substantially in accordance with the above described testing and ageing procedures. The color and transparency of the sample prior to, and subsequent to, ageing are also noted as described above. The results of testing the polyester devoid of additive are also reported in the Table below.

TABLE

| PROPERTIES | POLYESTER ADMIXED WITH SURFACE ACTIVE COMPOUND ADDITIVE | POLYESTER (Control) |
|---|---|---|
| Prior to Ageing: | | |
| Tensile Strength, psi | 9,900 | 9,900 |
| Tensile Modulus, psi × $10^5$ | 3.3 | 3.4 |
| Color and Transparency | light yellow, substantially transparent | light yellow, substantially transparent |
| After 30 Days Ageing at 160°: | | |
| Tensile Strength, psi | 12,000 | |
| Tensile Modulus, psi × $10^5$ | 3.4 | not measured |
| After 60 Days Ageing at 160°: | | |
| Tensile Strength, psi | 12,200 | 6,700 |
| Tensile Modulus, psi × $10^5$ | 3.0 | 3.18 |
| Color and Transparency | light amber, substantially transparent | dark amber, substantially transparent |

From the foregoing results reported in the Table it is seen that the composition of the invention undergoes about a 23% enhancement in tensile strength on ageing at elevated temperature for 60 days (corresponding to ageing at ambient temperatures for about 2 to 5 years). In contrast, the polyester devoid of the present additive undergoes a loss of about 32.4% in tensile strength after ageing at 160° for the same period under substantially the same conditions. It is further noted that the change in tensile modulus under ageing conditions is about the same for both samples being compared on ageing.

The change in color for the polyester sample containing the additive compared to the change in color for the polyester devoid of the additive indicates that while the presence of the additive inhibits the discoloration of the polyester slightly, the presence of the additive in the polyester does not effectively prevent discoloration of the polyester on ageing.

EXAMPLE 3

A composition containing 24.94 g. of the bisphenol A-isophthalate-terephthalate polyester of Example 1A and 0.06 g. of the perfluoroalkenyl-substituted surface active compound additive of Example 2 (corresponding to about 0.024% of solid additive based on the polyester) is prepared substantially as described in Example 2. The product, which is amber in color and has an intrinsic viscosity of 0.54 dl/g, is tested in a Brabender Plastograph for thermal stability on processing and for ease of processability in comparison to a comparably prepared control sample of the polyester devoid of the additive (which sample is brownish amber in color and has intrinsic viscosity of 0.52 dl/g). The test results indicate that the polyester containing the additive and the polyester devoid of the additive possess about the same thermal stability on processing and are about the same in ease of processability.

EXAMPLE 4

A bisphenol A-isophthalate-terephthalate polyester prepared by melt polymerization substantially as described in Example 1B above is also mixed and molded with the additive of Example 2 employing about the same proportion of additive as is employed in the latter example. An excellent product substantially similar to that of Example 2 is obtained.

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In a thermoplastic polymer composition comprising a linear aromatic polyester of a bisphenol and a dicarboxylic acid, the improvement wherein the polyester contains, in admixture, a minor proportion based on the weight of the polyester of a compound of the formula:

$$C_{2n'}F_{4n'-1}OC_6H_4SO_2N(CH_2)_{m'}OPO_3M_2$$
$$|$$
$$R$$

wherein
M is hydrogen, alkali metal, ammonium, alkyl-substituted ammonium, or mixture thereof,
n' is 4, 5 or 6,
R is an alkyl group containing from one to five carbon atoms or is hydrogen, and
m' is an integer from one to six.

2. The composition of claim 1 wherein said dicarboxylic acid has the formula:

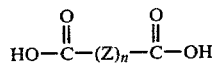

wherein Z is alkylene, —Ar— or —Ar—Y—Ar— where Ar is aromatic, Y is alkylene, haloalkylene, —O—, —S—, —SO$_2$—, —SO$_3$—, —CO—,

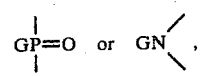

wherein G is alkyl, haloalkyl, aryl, haloaryl, alkylaryl, haloalkylaryl, arylalkyl, haloarylalkyl, cycloalkyl or cyclohaloalkyl; and n is 0 or 1.

3. The composition of claim 2 wherein said dicarboxylic acid is an aromatic dicarboxylic acid.

4. The composition of claim 3 wherein said aromatic dicarboxylic acid is selected from the group consisting of isophthalic acid, terephthalic acid, and mixtures thereof.

5. The composition of claim 1 wherein said bisphenol has the formula:

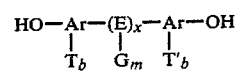

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$—, —CO—,

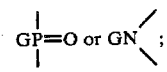

T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

6. The composition of claim 5 wherein the bisphenol is bisphenol-A.

7. The composition of claim 1 wherein said linear aromatic polyester includes an aliphatic modifier.

8. The composition of claim 7 wherein said aliphatic modifier is a glycol of 2 to 100 carbon atoms.

9. The composition of claim 8 wherein said glycol is selected from the group consisting of neopentyl glycol, diethylene glycol, ethylene glycol, and mixtures thereof.

10. The composition of claim 1 wherein the aromatic polyester is prepared by a melt polymerization process.

11. The composition of claim 1 wherein m' is an integer less than 4 and R is methyl or ethyl and the proportion of the surface active additive is about 0.001 to about 5 weight percent based on the weight of the polyester.

12. The composition of claim 11 wherein n' is 5, m' is 2 and M is hydrogen and the proportion of the surface active additive is about 0.05 to about 2 weight percent based on the weight of polyester.

13. The composition of claim 1 which also includes a filler material.

14. The composition of claim 13 wherein the filler is glass fiber.

15. A thermoplastic polymeric composition which exhibits enhanced tensile strength on ageing which comprises in admixture (a) a linear aromatic polyester of a bisphenol and an aromatic dicarboxylic acid and (b)

about 0.01 to about 3 weight percent based on the weight of the polyester of a compound of the formula:

$$C_{10}F_{19}OC_6H_4SO_2N(CH_3)CH_2CH_2OPO_3H_2$$

16. A molded article formed from the composition of claim 1.

17. A molded article formed from the composition of claim 10.